US010919700B2

(12) United States Patent
Bourke et al.

(10) Patent No.: US 10,919,700 B2
(45) Date of Patent: Feb. 16, 2021

(54) MOBILE STORAGE SYSTEM WITH DIRECT WIRELESS CONNECTIVITY

(71) Applicant: Spacesaver Corporation, Fort Atkinson, WI (US)

(72) Inventors: Brian Patrick Bourke, Milton, WI (US); Eric James Wipperfurth, Fort Atkinson, WI (US)

(73) Assignee: Spacesaver Corporation, Fort Atkinson, WI (US)

( * ) Notice: Subject to any disclaimer, the term of this patent is extended or adjusted under 35 U.S.C. 154(b) by 155 days.

(21) Appl. No.: 16/274,388

(22) Filed: Feb. 13, 2019

(65) Prior Publication Data

US 2019/0256287 A1   Aug. 22, 2019

Related U.S. Application Data

(60) Provisional application No. 62/633,173, filed on Feb. 21, 2018.

(51) Int. Cl.
*G06F 7/00* (2006.01)
*B65G 1/137* (2006.01)
(Continued)

(52) U.S. Cl.
CPC .............. *B65G 1/137* (2013.01); *A47B 53/02* (2013.01); *A47B 57/06* (2013.01); *G06Q 10/00* (2013.01);
(Continued)

(58) Field of Classification Search
CPC .......... B65G 1/137; B65G 1/10; G06Q 10/00; G06Q 10/087; A47B 53/02; A47B 57/06; H04W 76/10; H04W 4/029; H04W 12/08
(Continued)

(56) References Cited

U.S. PATENT DOCUMENTS 9,185,099 B2    11/2015  Brannon
2010/0316470 A1*  12/2010  Lert ..................... B65G 1/1373
                                                      414/273
(Continued)

FOREIGN PATENT DOCUMENTS

GB          2491340 A    12/2012
GB          2515077 A    12/2014
(Continued)

OTHER PUBLICATIONS

Higginbotham, Stacey. "Grocery shopping might be less painful with this smart cart." Gigaom.com. Feb. 11, 2015.
(Continued)

*Primary Examiner* — Yolanda R Cumbess
(74) *Attorney, Agent, or Firm* — Andrus Intellectual Property Law, LLP

(57) ABSTRACT

A mobile storage system including a plurality of movable storage units that can be positioned to selectively form an aisle between adjacent storage units. The mobile storage system includes a master controller in communication with a local control unit and a local control panel on each storage unit. The master controller communicates through a wireless communication path with a user device having a visual display. The visual display presents a current image of the mobile storage system and allows a user to enter commands to create aisles between adjacent storage units. When the user device is in wireless communication with the master controller, the master controller prevents operation of the storage units from the local control panels. The master controller allows a wireless communication path to be created with only a single user device at any time such that only one user device is able to operate the mobile storage system.

19 Claims, 17 Drawing Sheets

(51) Int. Cl.
  *A47B 57/06* (2006.01)
  *H04W 76/10* (2018.01)
  *H04W 4/029* (2018.01)
  *G06Q 10/00* (2012.01)
  *A47B 53/02* (2006.01)
  *H04W 12/08* (2021.01)

(52) U.S. Cl.
  CPC .......... *H04W 4/029* (2018.02); *H04W 76/10* (2018.02); *H04W 12/08* (2013.01)

(58) Field of Classification Search
  USPC .................................................. 700/213–216
  See application file for complete search history.

(56) References Cited

U.S. PATENT DOCUMENTS

| | | | |
|---|---|---|---|
| 2013/0127638 | A1 | 5/2013 | Harrison |
| 2015/0179006 | A1 | 6/2015 | Von Zurmuehlen et al. |
| 2015/0186840 | A1 | 7/2015 | Torres et al. |
| 2016/0006768 | A1 | 1/2016 | Tse |
| 2016/0259342 | A1* | 9/2016 | High .................... G05D 1/0011 |
| 2016/0349749 | A1* | 12/2016 | Gariepy ................ G05D 1/0223 |

FOREIGN PATENT DOCUMENTS

| | | |
|---|---|---|
| KR | 1393389 B1 | 5/2014 |
| WO | 2003069566 A2 | 8/2003 |

OTHER PUBLICATIONS

IBeacon. Wikipedia.org. Jan. 7, 2016. Retrieved from https://en.wikipedia.org/w/index.php?title=IBeacon&oldid=697925280.
Swedberg, Claire. "Panasonic Adds Bluetooth Beacons to Electronic Shelf Labels." RFID Journal. Feb. 4, 2015. Retrieved from http://www.rfidjournal.com/articles/view?12675.
"SEDtag-RFID Wireless Tracking Solutions and Tagging Products." SEDCO. 2012. Retrieved from http://www.sedco.net.au/wireless.html on Jan. 7, 2016.
Swedberg, Claire. "Zebra's Painter Protection System Helps Prevent Falls at Boeing." RFID Journal. May 8, 2015. Retrieved from http://www.rfidjournal.com/articles/view?13024.
Roberti, Mark. "Tracking Track Workers for Safety." RFID Journal. Aug. 1, 2010. Retrieved from https://www.rfidjournal.com/purchaseaccess?type=Article&id=7743&r=%2Farticles%2Fview%3F7743.
"Weapons Racks & RFID Tracking Software" Southwest Solutions. 2015. Retrieved from http://www.southwestsolutions.com/equipment/weaponsracksandridtracking on Jan. 7, 2016.
Montel, Epulse V2.5.0 Operation Manual, Nov. 26, 2015, pp. 7, 27, 30, 35-38, and 42-48, published to Salesforce web platforms.†
Montel, Controller v4 Upload Instructions, Jun. 20, 2015, pp. 1-5, published to Salesforce web platforms.†
Montel, ePulse Remote Monitoring and Configuration Software, Apr. 22, 2013, published to Youtube.†
Montel, SAFERAK® 60 Industrial Powered Mobile Racking, May 10, 2011, published to Youtube.†

\* cited by examiner
† cited by third party

SAFETY STATUS

| | LEFT | RIGHT |
|---|---|---|
| SAFETY 1 | NORMAL | NONE |
| SAFETY 2 | NONE | NONE |
| SAFETY 3 | NONE | NONE |

READING DIAG...

FIG. 20

MODLOGIC STATUS

| | |
|---|---|
| VERSION: | 5.x01 |
| TIMESTAMP: | DEC 6 2018 |
| ECLIPSE COMMUNICATION: | GOOD |
| AUTOMOVE KEY STATUS: | INSTALLED |
| TEMPERATURE READING: | |
| HUMIDITY READING: | |
| INPUTS: | |
| AUXILIARY INPUT 1: | NORMAL |
| AUXILIARY INPUT 2: | NORMAL |
| FIRE PARK INPUT: | NORMAL |
| NIGHT PARK INPUT: | NORMAL |
| OPTION JUMPER 1: | NORMAL |
| OPTION JUMPER 2: | ACTIVATED |
| OPTION JUMPER 3: | NORMAL |

FIG. 21

MOBILE STORAGE SYSTEM WITH DIRECT WIRELESS CONNECTIVITY

BACKGROUND

The present disclosure generally relates to powered mobile storage systems. More specifically, the present disclosure relates to a wireless communication link between a powered mobile storage system and a remote smart device.

A mobile storage system typically consists of a number of storage units that are selectively movable relative to each other to form an aisle between an adjacent pair of the storage units. The storage units are typically mounted to a pair of spaced apart rails, and each storage unit includes a carriage having wheels that are movable along the rails. Each storage unit includes a drive motor that is responsive to command inputs from an operator, so as to provide movement of the storage units on the rails.

In the prior art, the number and spacing of the storage units are selected relative to the length of the rail such that a single aisle having a predetermined width can be created between any selected adjacent pair of storage units. Prior art powered mobile storage systems typically include a local control panel that allows an operator to selectively move the storage units to create an aisle in a desired location. Such system requires the operator to move between the storage units to create the aisle in a desired location. A limitation of this type of system is that an aisle between the storage units may be being created locally by one user while another, second user is in the process of obtaining material from a currently open aisle. Thus, it is desirable for the mobile storage system to have a control device that can be carried with the user and used to create an aisle at a desired location while preventing another user from controlling the movement of the storage units.

SUMMARY

The present disclosure relates to a powered mobile storage system that includes direct wireless connectivity between the storage system and a smart device. An application software that runs on the smart device provides diagnostic and software/firmware/configuration updates to the mobile storage system utilizing direct wireless communication. The communication allows the user/operator to configure operation of the mobile storage system from the smart device. A wide variety of operational functions and configurations can be adjusted from the smart device using the wireless connectivity of the present disclosure.

The mobile storage system of the present disclosure includes a plurality of movable storage units that each includes a local control unit and a local control panel. The local control panel includes buttons that allow a user to manually enter control commands to move the storage unit as desired. In accordance with the present disclosure, the mobile storage system includes a master controller that is in communication with the plurality of local control units and the plurality of local control panels. The master controller is connected to a wireless transceiver such that the master controller can receive and transmit messages and commands. The mobile storage system further includes a user device having a display that allows the user to enter commands and view control images related to the mobile storage unit on the user device. During operation, the user device communicates with the master controller such that the user can control operation of the mobile storage system through the user device.

In accordance with another aspect of the present disclosure, the display includes a visual representation of the series of movable storage units and the current location of each of the plurality of movable storage units. When the user device is in communication with the master controller, each of the local control panels is disabled and the master controller prevents a wireless connection to another user device. In this manner, only the user device in communication with the master controller is able to control the movement of the movable storage units.

The display of the user device includes a plurality of aisle indicators that each represents an aisle between a pair of adjacent storage units. By depressing one of the aisle indicators, the user is able to create separation between the pair of movable storage units. Each of the aisle indicators includes a visual indicator that indicates the status of the aisle. Different colors of the visual indicators provide information to the user as to the status of the aisle.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIGS. 13-24 are various display screens shown by the service application software on the smart device during operation of the mobile storage system of the present disclosure.

DETAILED DESCRIPTION

Figure 1:
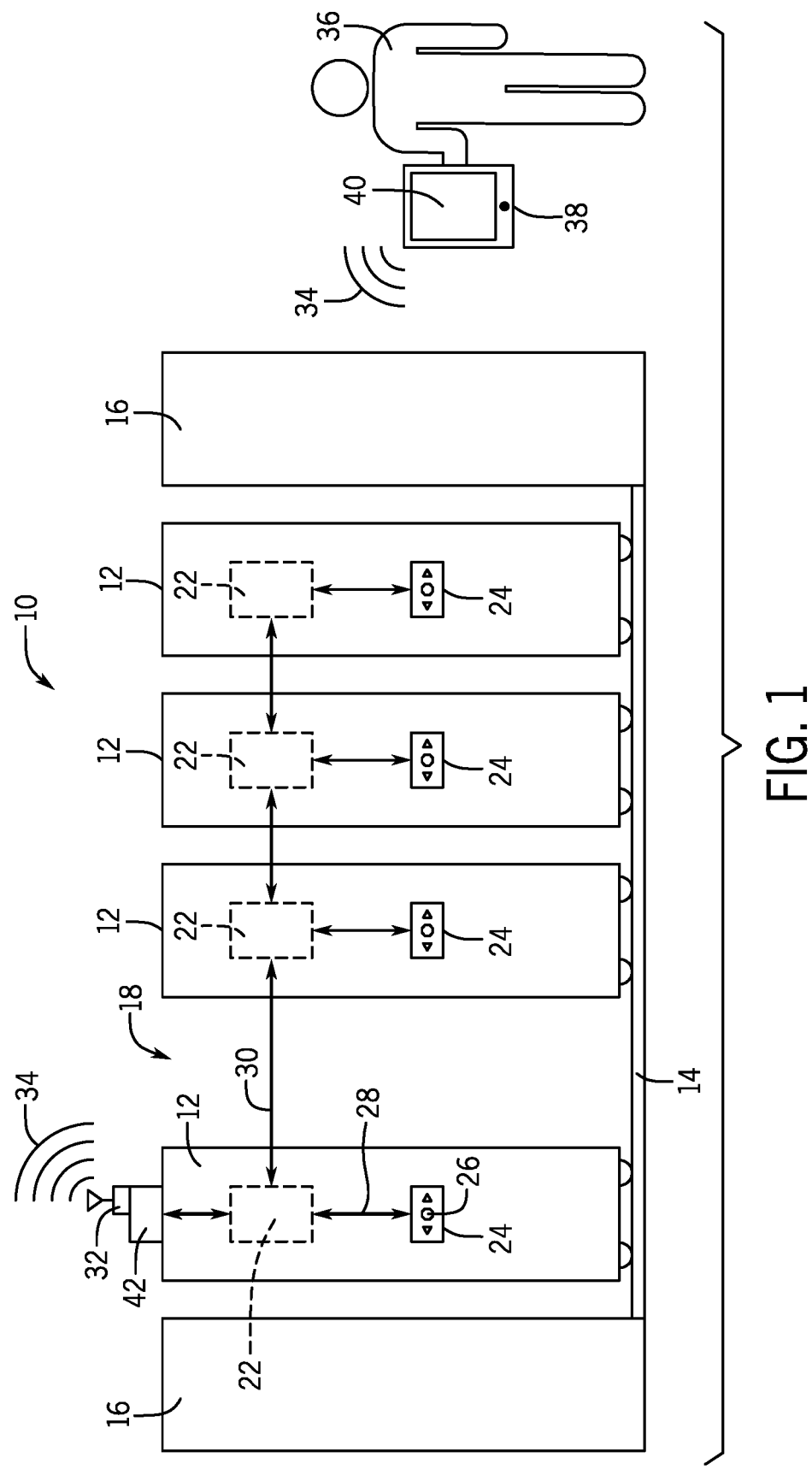
FIG. 1 is a schematic illustration of the powered mobile storage system including the wireless connectivity of the present disclosure.

FIG. 1 illustrates the operation of a powered mobile storage system 10 constructed in accordance with the present disclosure. As shown in the embodiment of FIG. 1, the mobile storage system 10 includes a series of powered mobile storage units 12 that each are movable along a floor mounted track 14 between a pair of stationary end units 16. The series of mobile storage units 12 define an access aisle 18 that allows a user to access materials stored on a pair of adjacent mobile storage units 12.

In the embodiment shown in FIG. 1, each of the storage units 12 includes a local control unit 22 and an associated control panel 24 that includes a series of control buttons 26 that allow an operator to locally control the movement of each of the individual mobile storage units 12.

Each of the local control panels 24 communicates with the associated local control unit 22 over a local communication path 28 while the individual control units 22 communicate with each other over a communication path 30. The communication path 30 between the control units 22 can either be a wired connection or a wireless connection. The communication path 30 allows each of the control units 22 to communicate with each other to relay various information as will be discussed in greater detail below.

In accordance with the present disclosure, the mobile storage system 10 includes a wireless transceiver 32 that is operable to communicate utilizing a wireless link 34 to remote devices. In the embodiment shown in FIG. 1, an operator 36 can utilize a smart device 38 to wirelessly communicate utilizing the wireless link 34 with the control unit 22 through the wireless transceiver 32. In the embodiment shown, the wireless communication link 34 is a Bluetooth direct link between the smart device 38 and the wireless transceiver 32. However, different types of wireless protocols could be utilized while operating within the scope of the present disclosure. In the embodiment shown, the smart device 38 can be a smartphone, tablet or any other type of portable device that can be used by the operator 36. The smart device 38 includes a display 40 that allows the operator 36 to visually view screen displays and enter commands.

In accordance with the present disclosure, the direct wireless connection between the smart device 38 and the powered mobile storage system 10 enables the remote control of the individual mobile storage units 12. The smart device 38 is configured to include a piece of application software that can operate on the smart device utilizing different types of operating systems, such as Apple iOS or Android.

The application software operating on the smart device 38 communicates to the powered mobile storage system 10 through a proprietary designed logic control through the wireless transceiver utilizing Bluetooth communication techniques. The logic control in the embodiment shown operates on a master controller 42 of the mobile storage unit 12 that includes or is directly in communication with the wireless transceiver 32. Although the master controller 42 and wireless transceiver 32 are depicted as being separate, it should be understood that the master controller 42 and wireless transceiver 32 could be combined into a single unit. The master controller 42 could be mounted on any one of the storage units 12 or 16 as long as the master controller 42 is in communication with the wireless transceiver 32 to communicate utilizing the wireless protocol. In the embodiment shown in FIG. 1, the local control unit 22 on the storage unit including the wireless transceiver 32 communicates directly to the master controller 42.

Figure 2:
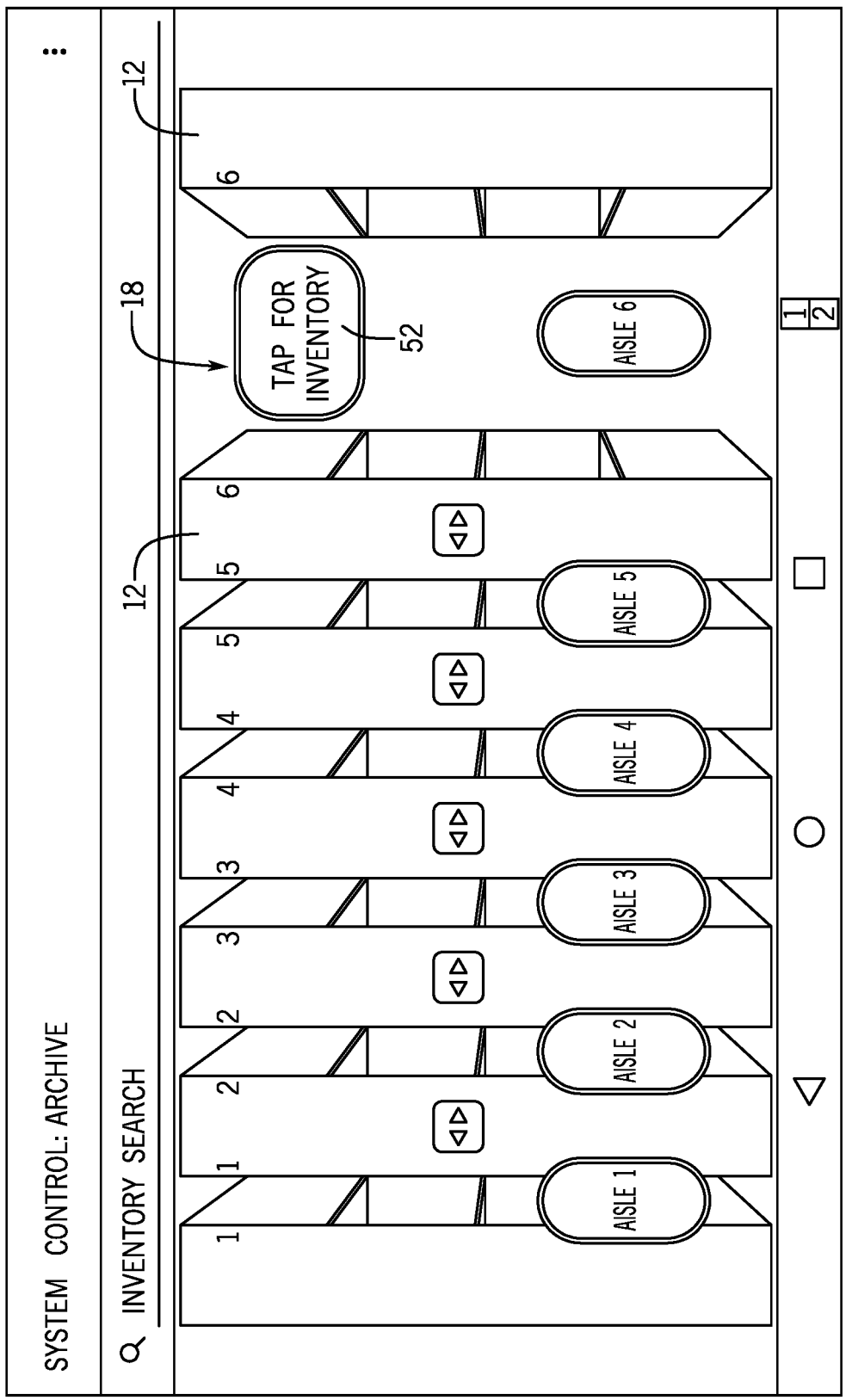
FIG. 2 is a display showing the individual mobile units and an aisle created within the mobile units.

The master controller 42 communicates to the local control unit 22 of each of the storage units 12 and continuously monitors and contains all status information regarding the position and operation of the storage units 12. The master controller 42 has the ability to configure and execute system movements based upon various triggers (real-time, elapsed time, interfaces to building security/fire/monitoring systems, etc.). Using this information, the master controller 42 communicates to the application software on the smart device 38 and provides the needed information such that the application software can then construct the visual representation of the mobile storage system 10, including the location of open or closed aisles and the status of each storage unit. FIG. 2 is a sample illustration that can be shown on the display of the smart device showing each of the individual mobile storage units 12 and the aisle 18 created between a pair of the storage units.

The application software running on the smart device 38 has the ability to access resources on the smart device itself. One specific resource reports the number of Bluetooth devices found in the communication area near the smart device 28. The master controller 42 contains a name and characteristic that are unique to the master controller 42. The application software on the smart device 38 scans for Bluetooth devices and uses the unique name and characteristics of located devices of interest. In this manner, the smart device 28 is able to find all detectable mobile storage systems 10 within communication range. The nearest storage system 10 is found by the application software utilizing the strength of the received Bluetooth signal. The stronger the received Bluetooth wireless signal, the closer the mobile storage system 10.

The graphic user interface 44 shown in FIG. 2 is designed to emulate the color-coded system utilized on the control panel 24 on each of the storage units. The local user controls 24 on each of the storage units have simple to understand status indicators. These indicators are also used on the application software.

Figure 4:
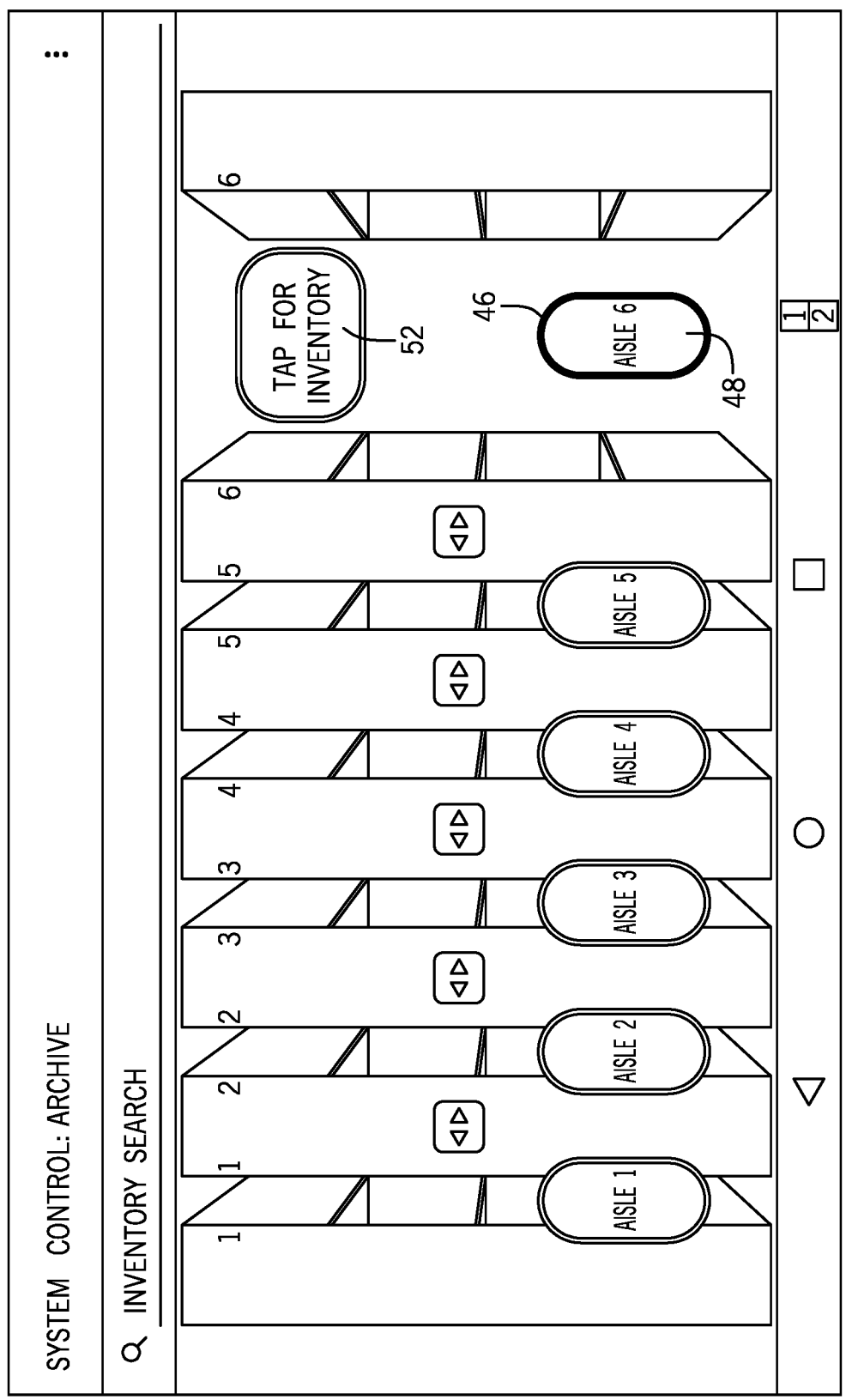
FIG. 4 is a display showing the activation of a sensor or safety system.
Figure 5:
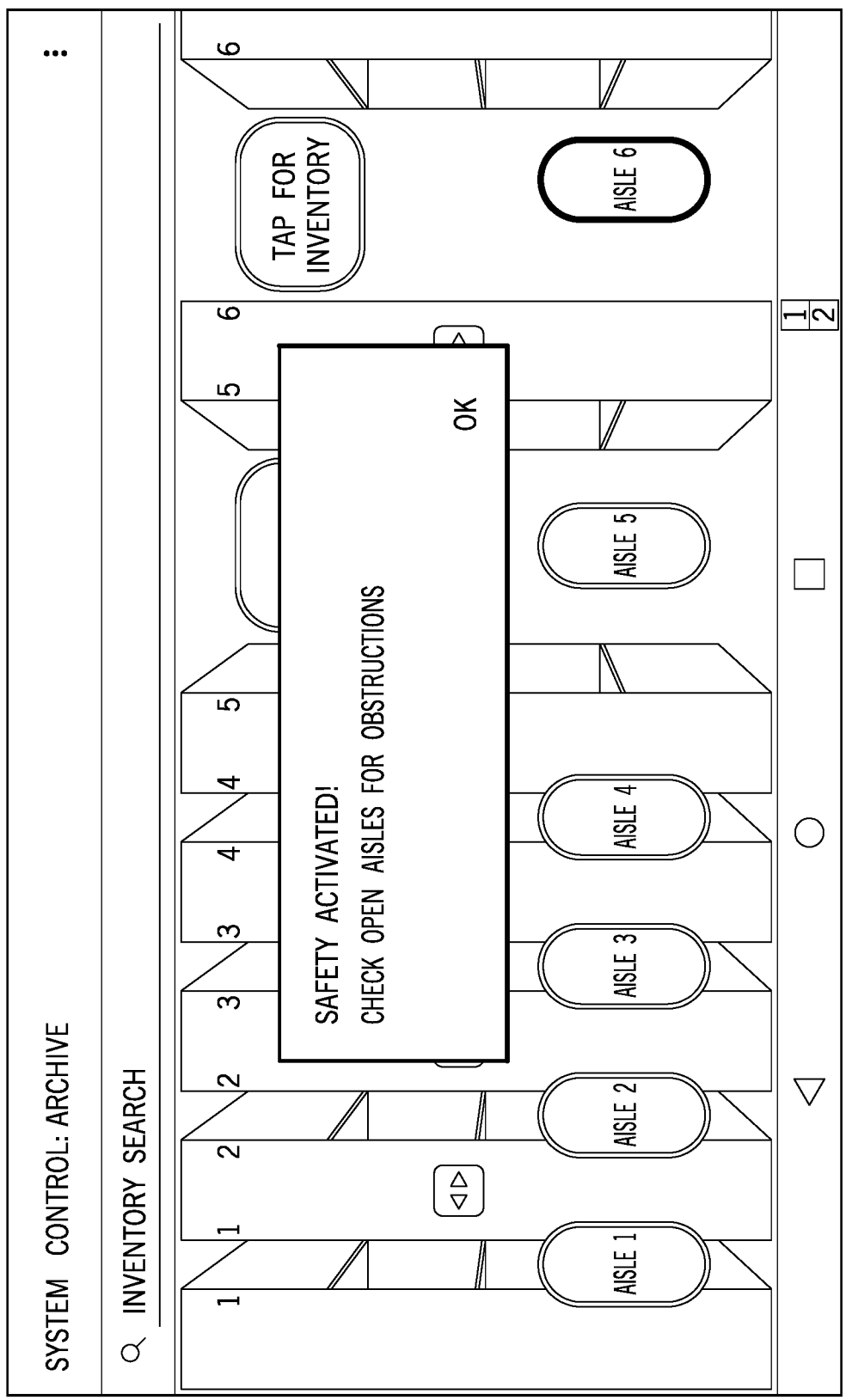
FIG. 5 is a view showing the activation of a safety feature.
Figure 6:
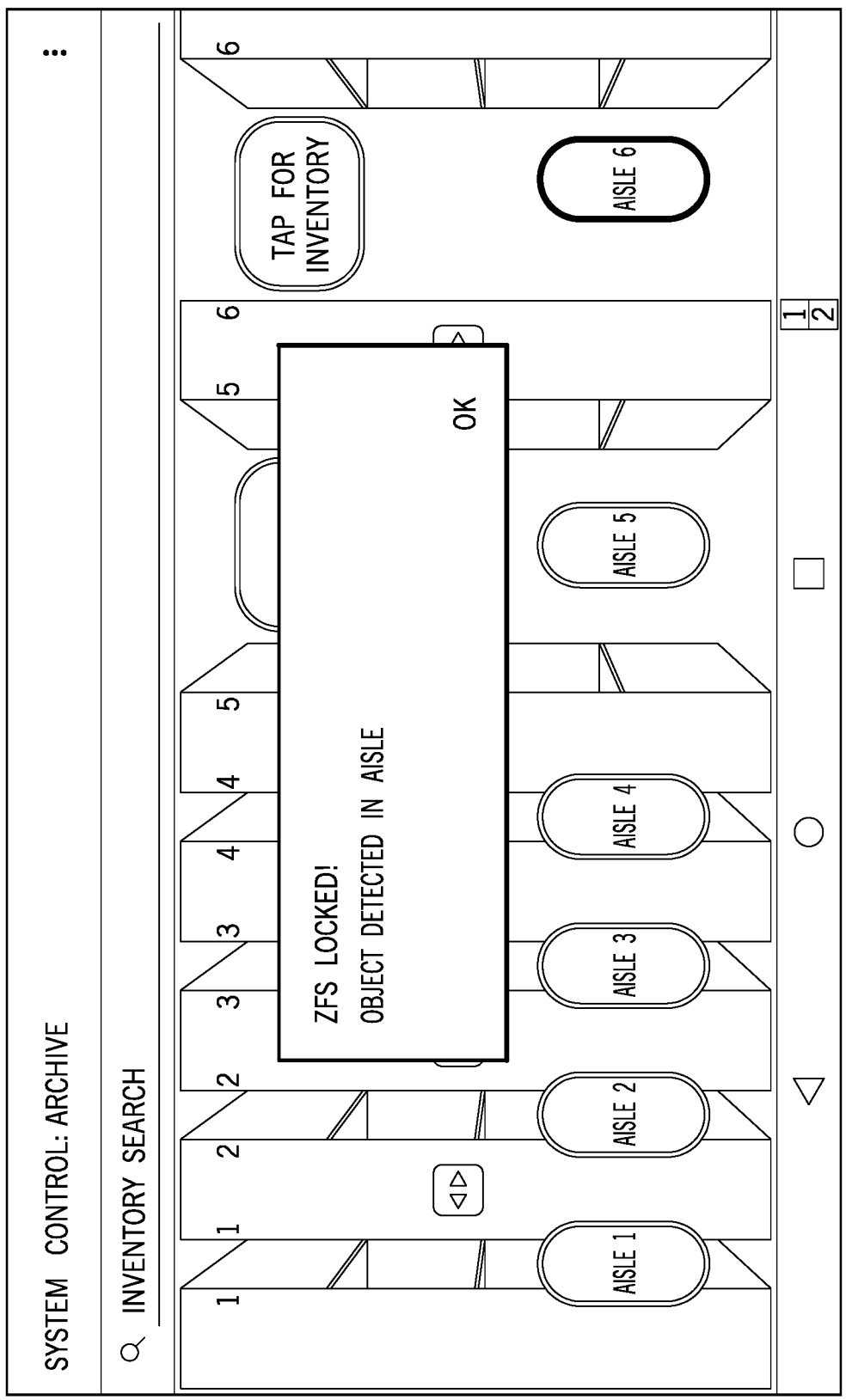
FIG. 6 is a pop-up message showing a locked aisle.

For example, the color red is indicative that a safety is activated and that the operator should check for an obstruction. As shown in FIG. 4, when a sensor or a safety is activated on the mobile storage system, the aisle indicator on the graphical user interface 44 includes a red outline 46 around the aisle indicator 48. In the embodiment shown in FIG. 4, the aisle indicator 48 is between a pair of the storage units. When a user presses the aisle indicator surrounded by the outline 46, a pop-up message is displayed that instructs the user on the status of the system and actions that can be taken. FIGS. 5 and 6 show various messages that can be presented to the operator, including that the aisle is locked or that an object was detected in the aisle.

Figure 7:
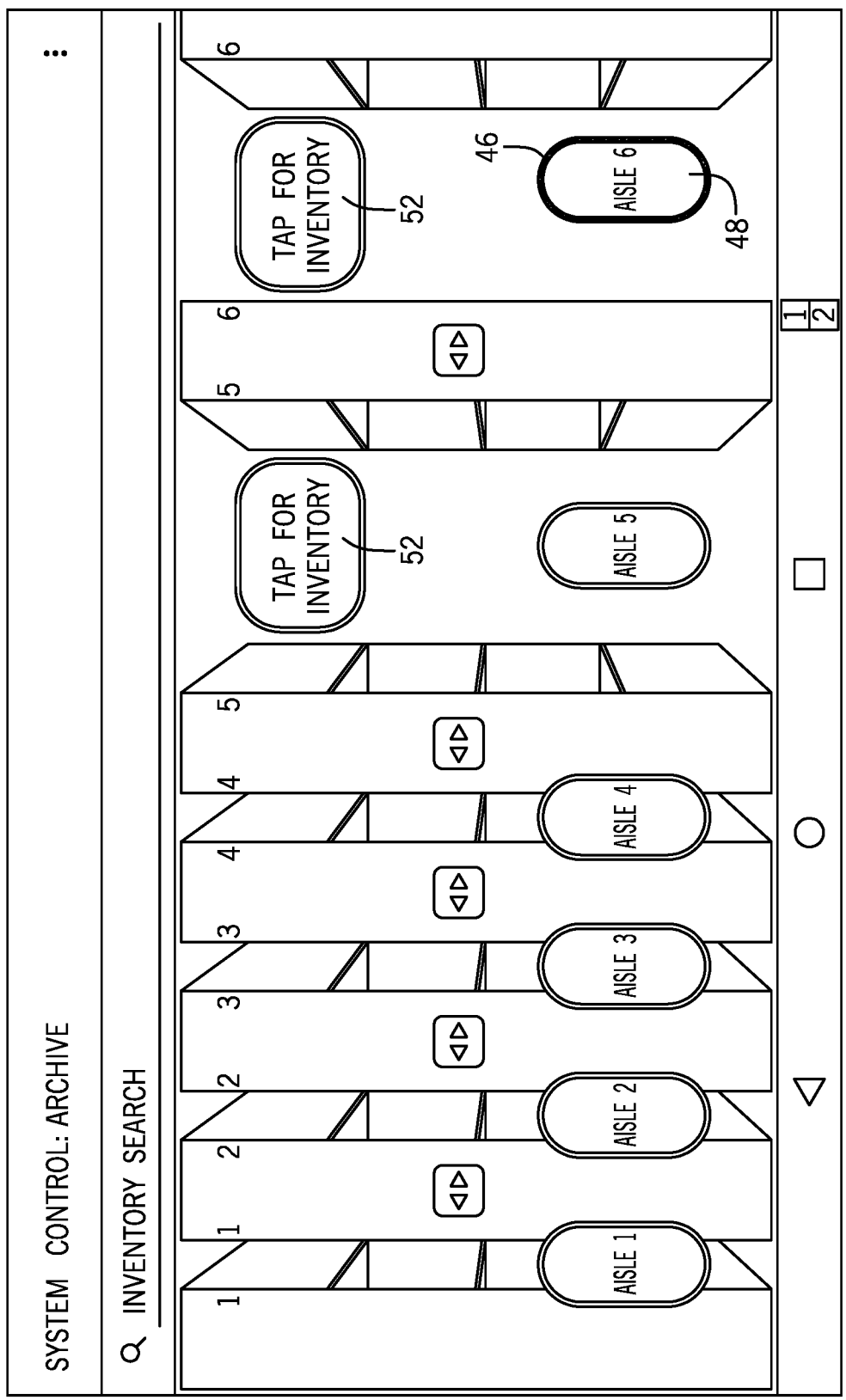
FIG. 7 is a display showing an outline around an aisle indicator indicating the aisle should be checked.
Figure 8:
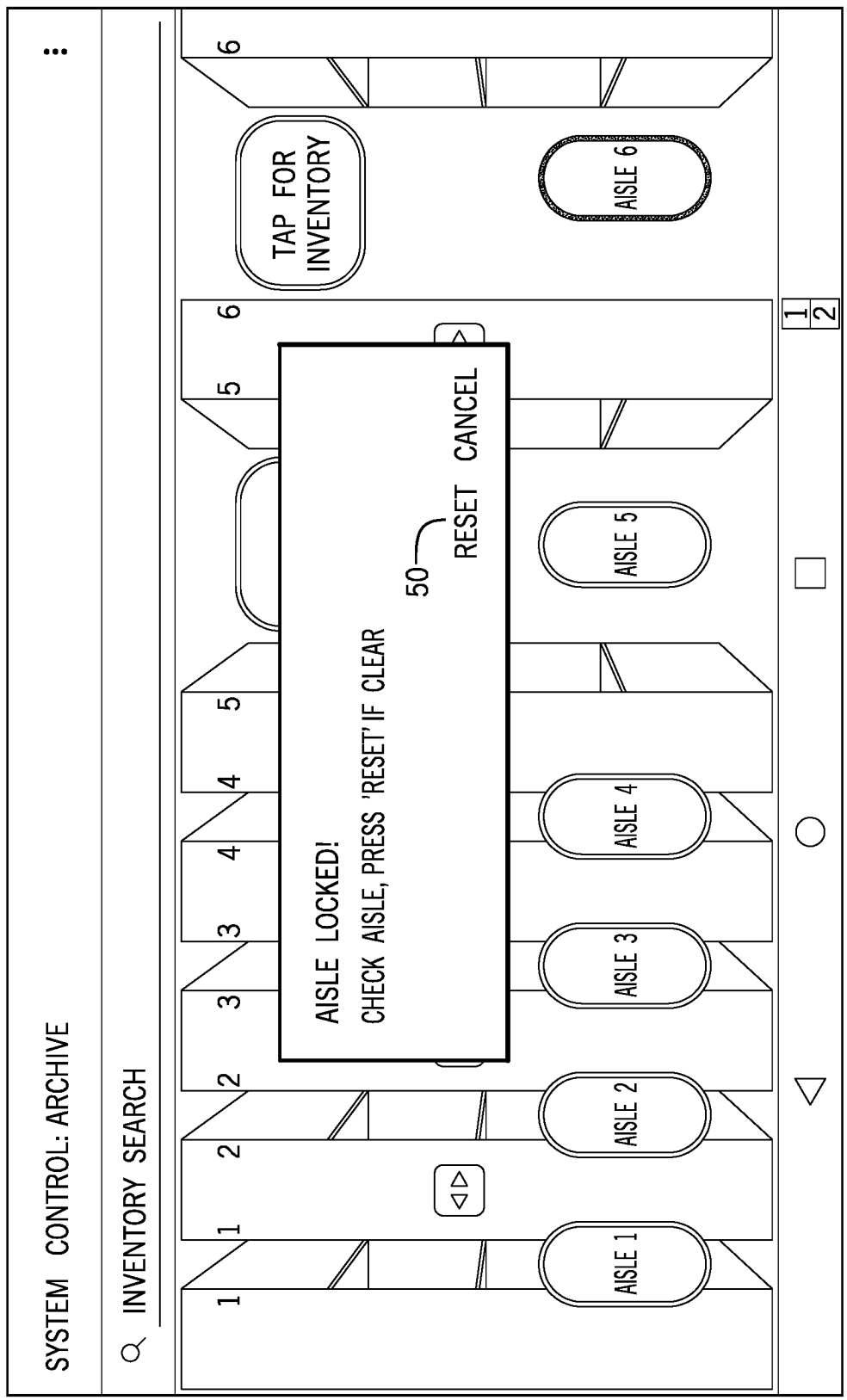
FIG. 8 is a pop-up message asking the user to clear the indicator.

FIG. 7 illustrates an embodiment in which the outline 46 is yellow which indicates to the operator that the aisle should be checked. If the outline 46 in FIG. 7 is yellow, the operator can press the aisle indicator 48 and a pop-up message, such as shown in FIG. 8 is presented to the operator. If the aisle is clear, the user can press the reset 50.

Figure 9:
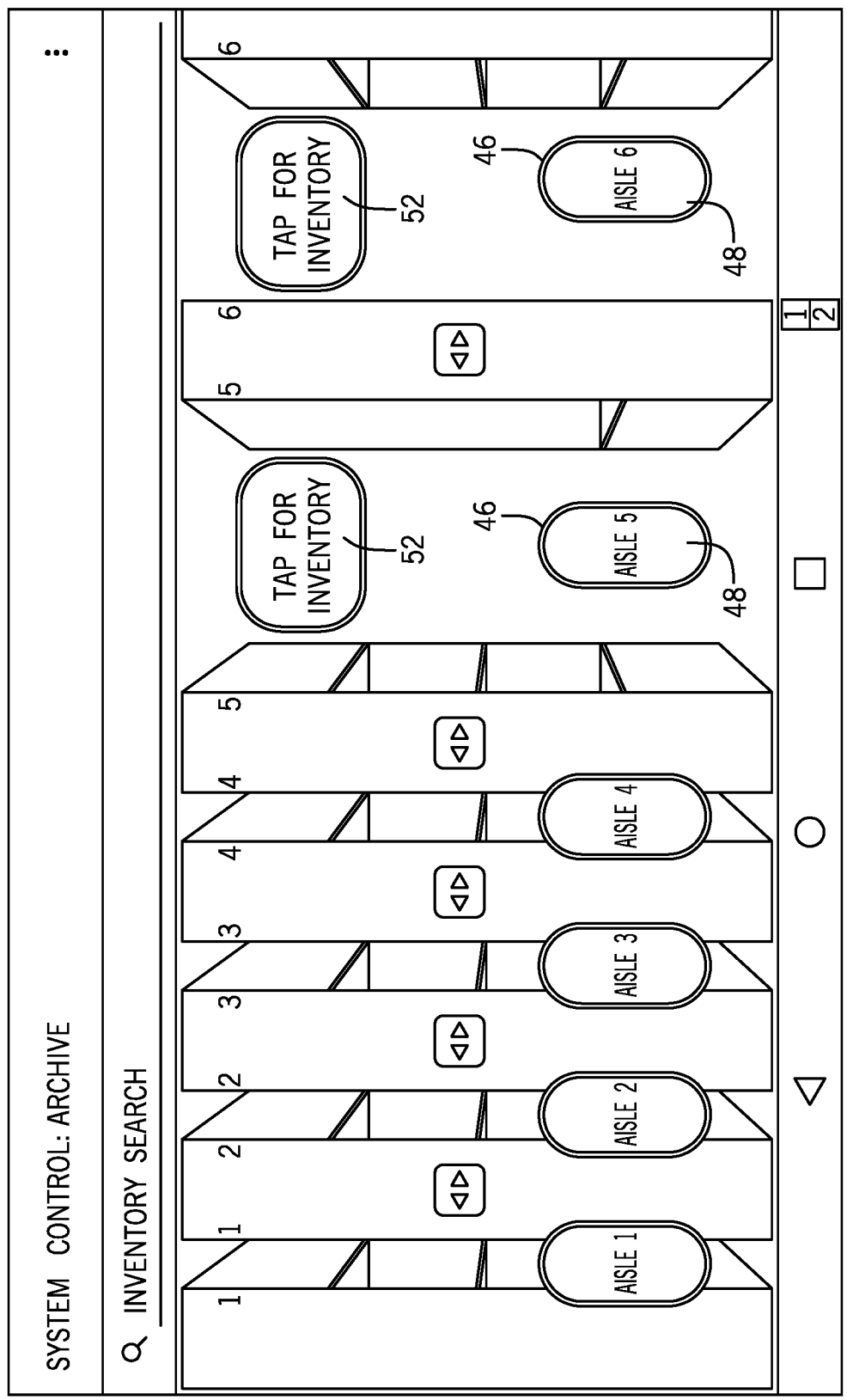
FIG. 9 is a display showing two aisles open for review.
Figure 10:
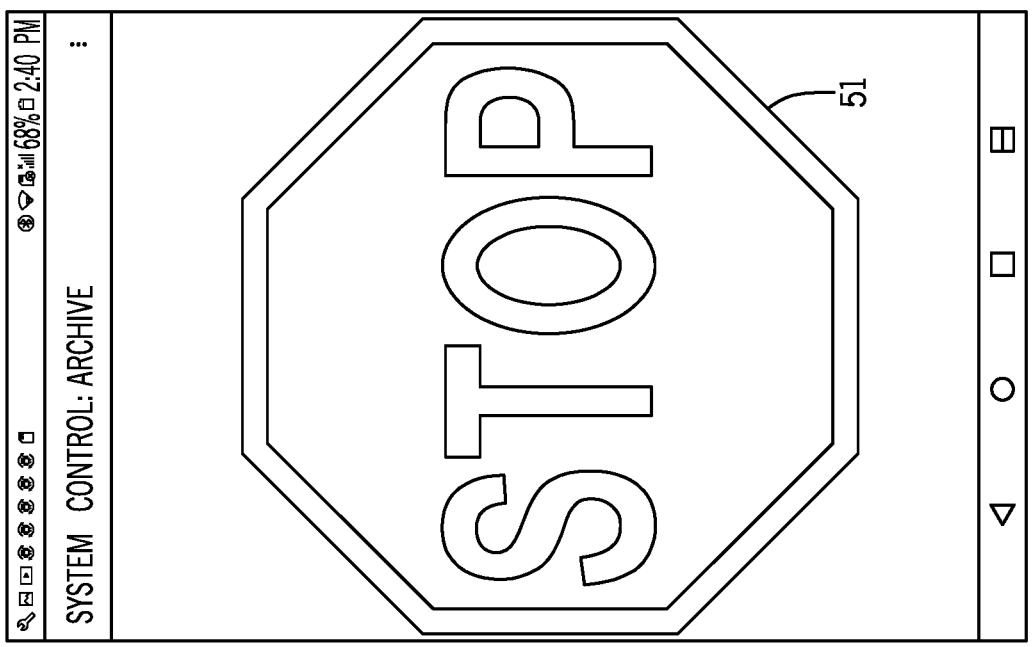
FIG. 10 is a stop button displayed on the smart device.

FIG. 9 illustrates an embodiment in which the outline 46 for each of the two aisle indicators 48 is green. The green color of the outline 46 indicates that the system is ready for use. When a user presses and holds the aisle indicator 46 for a defined period of time, haptic and audible feedback is given to the operator. The application software can then send a command to the mobile storage system 10 to open a selected aisle. As soon as movement begins, a stop sign 51 such as shown in FIG. 10 is shown on the display. The application user can depress the stop sign to stop all movement in the mobile storage system 10 as needed.

The application software of the present disclosure also includes the ability to allow reset if the system has at least two safeties per aisle. The feature to reset locked (yellow) aisles from the application software allows the application user to clear locked aisles and make the system ready for use. This feature can be deactivated in several ways. For example, a minimum number of safeties, proximity to the system, or a setting that only a trained service personnel or administrator has access to are a few of the contemplated methods.

When the application software is connected to the mobile storage system 10 for the first time, the application on the smart device will allow the user to name the mobile storage system. This information can be stored locally on the smart device or centrally on the master controller 42. Subsequent connections to the mobile storage system will use the name assigned.

As indicated above, proximity to the mobile storage system 10 is determined by the wireless signal strength at the smart device 38. The stronger the signal, the closer the smart device 38 is to the storage system 10. Additional resources available on the smart device 38 can be accessed to more accurately determine proximity. These resources can include GPS, compass, and various RF pinging signals to a known fixed location and measuring time for a message roundtrip resulting in triangulation of the smart device.

Each smart device 38 has a unique identifier. Further, each master controller 42 has a unique identifier. The application software has access to these unique identifiers and can grant or restrict access to the mobile storage system movements and settings via the master controller 42. The access can be set up and changed by an administrator who has unique access rights. When the application software is connected to the mobile storage system 10 through the master controller 42, events can be recorded into a log file and stored locally on the smart device or centrally on the master controller or centrally using cloud storage. It is also possible for the system events and diagnostic logs to be sent manually or automatically to service personnel or administrators. This information can be used to keep the system operating at peak performance and the items can be organized on the system in the most efficient method to minimize access time.

The system operation of the present disclosure also provides the ability to grant or restrict access to system controls by a passcode and/or other unique device identifiers. Each smart device 38 has a unique identifier, as does each of the master controllers 42. The application software can grant or restrict access to the mobile storage system 10 movements utilizing the master controller 42. The access can be set up and changed by an administrator who may issue passcodes in addition to the unique identification to further restrict or grant access to specific movements and/or settings of the mobile storage system.

When the application software on the smart device 38 establishes wireless communication to the master controller, all access to the master controller is disabled from other sources. These sources include the individual control panels 24, other smart devices, RF remotes and IR remotes. However, one control that is always active from every source is the stop button. The lock-out feature gives an added level of assurance to the user who might be accessing stored items while on foot, motorized lift, or fork truck that the system cannot be moved while the app is connected. Additional features are envisioned that allow an administrator to disconnect a user who has unintentionally stayed connected for too long.

To easily connect the application software on the smart device 38 to the master controller 42, a unique passcode is given to the master controller 42. By entering this passcode, an additional level of security is used to assure that only authorized users can connect the application software to the master controller. The passcode is only required to be entered one time on a smart device 38. At the time the passcode is entered, the master controller 42 may log the event.

In further accordance with the present disclosure, only a single person at a time can be connected to the mobile storage system 10. The user lock-out feature allows an administrator to set access to the system only by the application software on the smart device 38. This feature may be used in areas of public access, such as a library where students and faculty are issued the app and the controls on the system are locked out. This assures that only one user at a time can access the system. This further allows a complete log of who accessed the system, where access occurred, the time and date of the access, as well as the duration of the access.

Figure 3:
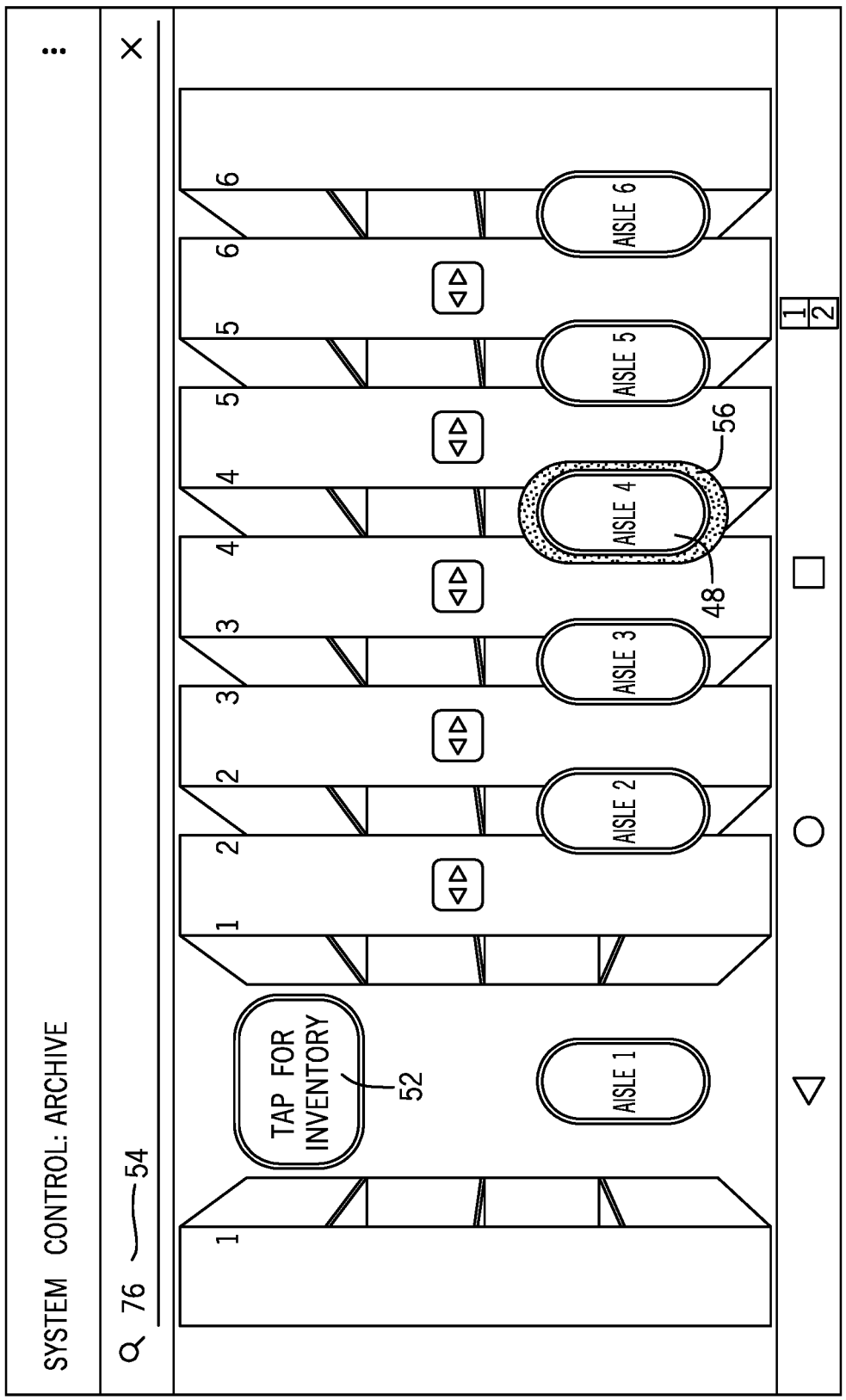
FIG. 3 is a display showing an inventory search function.
Figure 11:
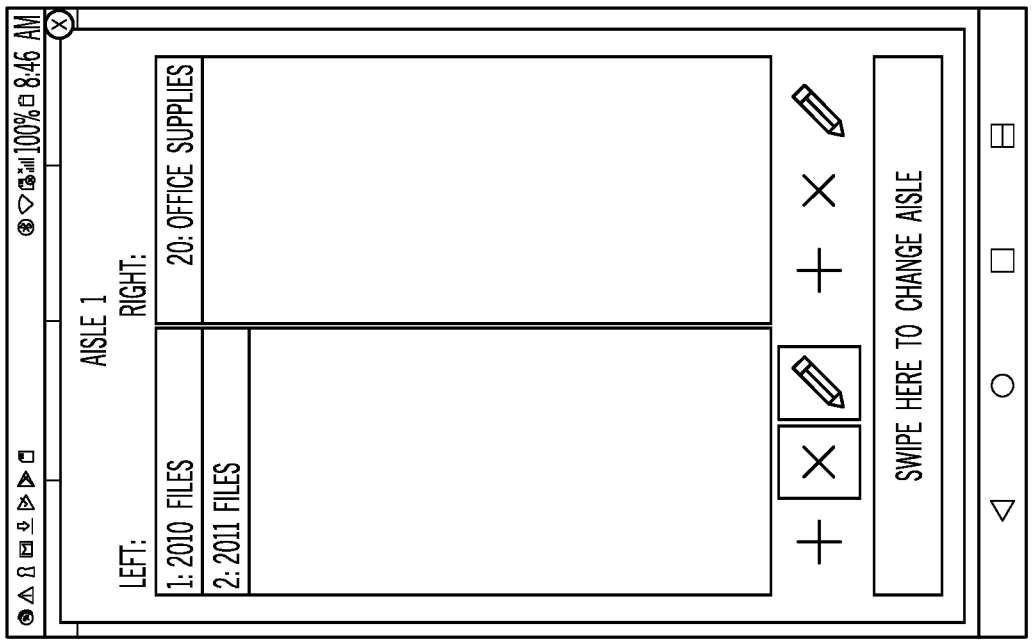
FIG. 11 is a view showing an inventory feature.

As shown in several of the drawing figures, an inventory list button 52 is shown on the display for the open aisle or aisles. When depressed, an inventory listing is presented to the user, which is a simple searchable text listing of items that are stored on the left and right side of each aisle in the mobile storage system 10. The application software on the smart device shows the simple "Tap for Inventory" button 52 in open aisles. When the button 52 is pressed, a pop-up list of items stored on the system on the left and right is displayed. An example of the list is shown in FIG. 11. Three methods of searching for items are:

a. The user visually scans the pop-up list in the open aisle and swipes left or right to view item lists of other aisles to find the desired item. The list of items can be presented in a text listing or through a series of photographs representing the stored items.

b. Key in the item to be found in the search bar and when found the boarder around the aisle indicator will be highlighted indicating the item location. An example of this is shown in FIG. 3 where an item named 76 is entered into the search bar 54 and is searched for and shows it is located in aisle 4. A highlight indicator 56 surrounds the aisle indicator 48 and can be of a visually distinct color, such as magenta.

c. Voice commands may be used to search the text inventory. If the item is found the aisle indicator 48 will highlight using the indicator 56 and the opportunity to open the aisle via voice command is given if the system is "green" ready for use. The use of voice commands to located inventory and operate the system to move the mobile units reduces the physical requirements on the operator, which may be a benefit to some operators with physical limitations.

Editing the text entries of inventory items (FIG. 11) stored in the system can be entered from within the application software by pressing +, X, or pencil icon buttons then keying in the items in the correct location, or a file that was created elsewhere can be imported. The inventory list is then saved locally on the smart device in a unique file format.

a. Alternately information may be centrally stored on the master controller or on a local server or a location in the cloud.

b. The inventory list file can be imported/exported into and out of the application software and sent via email.

Control and setup automatic movements of the mobile units 12 of the mobile storage system 10 can be time or trigger based. While the application software is connected to the mobile storage system 10, the movements of the system can be recorded and named as a movement. This named movement can then be set up to be triggered by the application software or by other time-based or external triggers.

The ability to use a smart device as a credential for local operation of the system is a valuable feature of the present disclosure. The smart device 38 acts like a key which allows the system to be used. An example is as follows: the mobile storage system 10 move buttons on the local control panel 24 are not active; the application software connects to the mobile storage system 10; the mobile storage system move buttons on the local control panel 24 are active and all movements are recorded; the user closes the application software; the mobile storage system move buttons on the local control panel 24 are not active.

Figure 12:
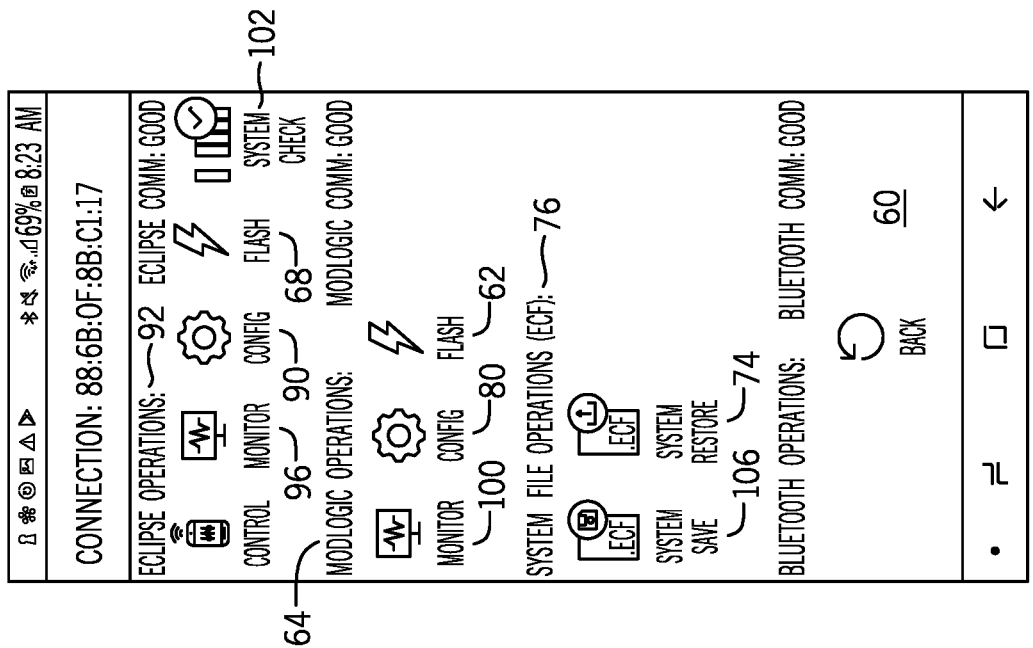
FIG. 12 is a main page displayed by service application software on a smart device.

The application software on the smart device 38 gives the service personnel the ability to program and/or update software, firmware, and configuration parameters on the mobile storage system 10. FIG. 12 shows an example of the diagnostic and service application software main page 60. The service personnel loads software, firmware, or configuration files to the smart device from email or downloads from a secure site. These files are then available to the application software on the smart device 38.

Figure 13:
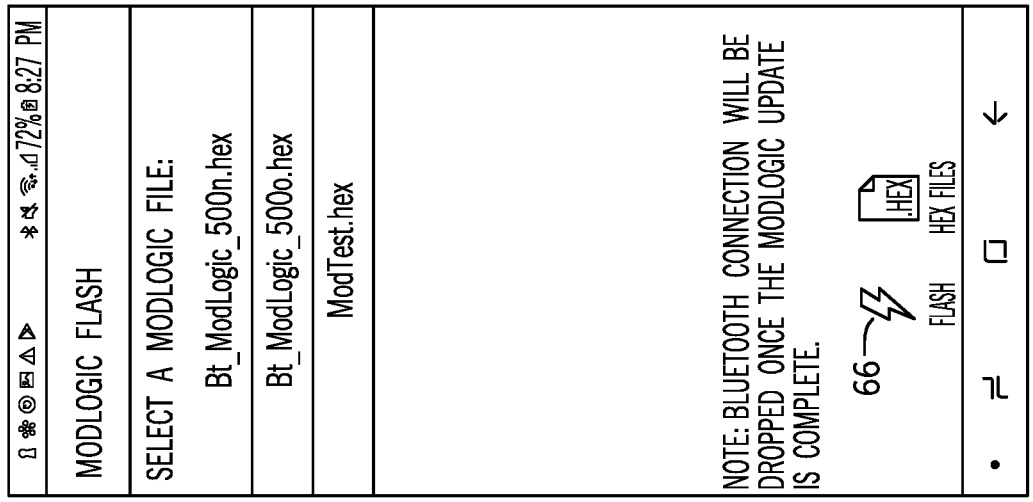

To update firmware on master controller 42 the "FLASH" button 62 is pressed on the Modlogic Operations section 64 on the main page 60. A screen, such as in FIG. 13, is then displayed on the smart device 38. The display shows the firmware files available to load on the master controller 42. A file is selected and then "FLASH" button 66 is pressed to update the firmware on the master controller 42. Various status messages and confirmation messages are displayed during the update processes that are useful to the service personnel in ensuring that the update process is performed correctly.

Figure 14:

A similar process is followed to update the firmware on all the control units 22 contained on the individual storage units 12 of the mobile storage system 12. To update firmware on the control units 22, the "FLASH" button 68 is pressed on the Eclipse Operations section on the main page 60 shown in FIG. 12. A screen, such as in FIG. 14, is then displayed on the smart device. The display shows and lists the firmware files available to load on the individual control units 22. A file from the list 70 is selected and then the "FLASH" button 72 is pressed to update the firmware on the control units 22. Various status messages and confirmation messages are displayed during the update process that are useful to the service personnel in ensuring that the update process performed correctly on all the local control units 22.

Figure 15:

The configuration of the mobile storage system 10 can be changed in several ways. One method is to load a file that contains all the configuration parameters. To load the updated parameters from a file, the "SYSTEM RESTORE" button 74 is pressed on the "System File Operations (ECF):" section 76 of the main page 60 shown in FIG. 12. A screen, such as shown in FIG. 15, is then displayed on the smart device 38. The image displays the configuration files available to load on the master controller 42 and the control units 22. A file is selected and then "SAVE" button 78 is pressed to update the configuration on the master controller 42 and the local control units 22 of the mobile storage system 10. Various status messages and confirmation messages are displayed during the update processes that are useful to the service personnel in ensuring that the configuration save process is performed correctly.

Figures 16, 17:
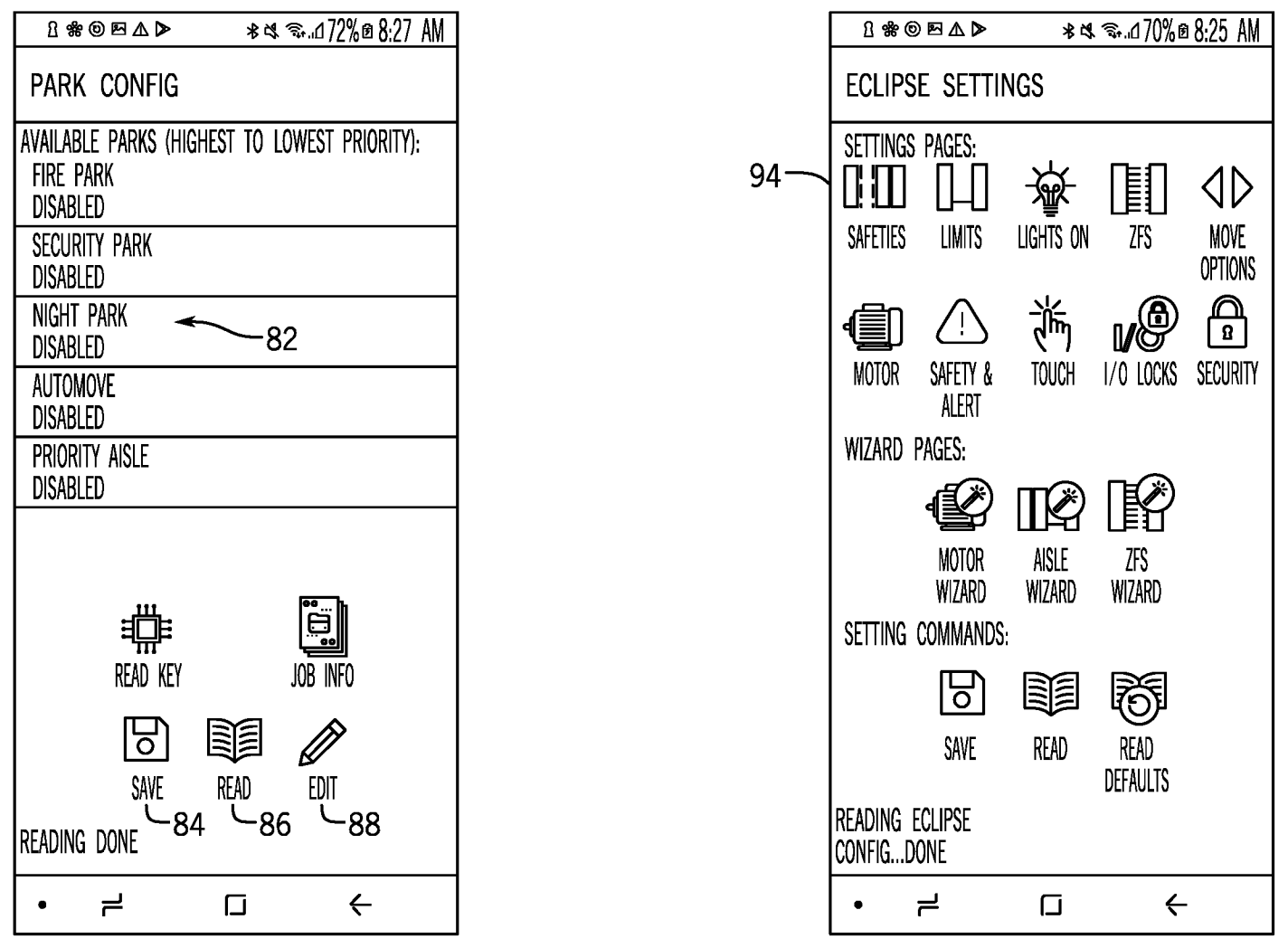

In another contemplated method, configurations can be changed individually or by group. There are many configurations for both the master controller 42 and the local control units 22. Configurations on the master controller 42 can be changed by pressing the "CONFIG" button 80 in the Modlogic Operations section 64 of the main page 60 shown in FIG. 12. A screen, such as shown in FIG. 16, is then displayed on the smart device 38. The screen displays a listing of the Park Configurations 82 for the mobile storage system 10. These parks are movements that are initiated by time or trigger. Each park configuration can be configured, read, and saved by using the buttons 84, 86 and 88 shown in FIG. 16.

Figures 18, 19:
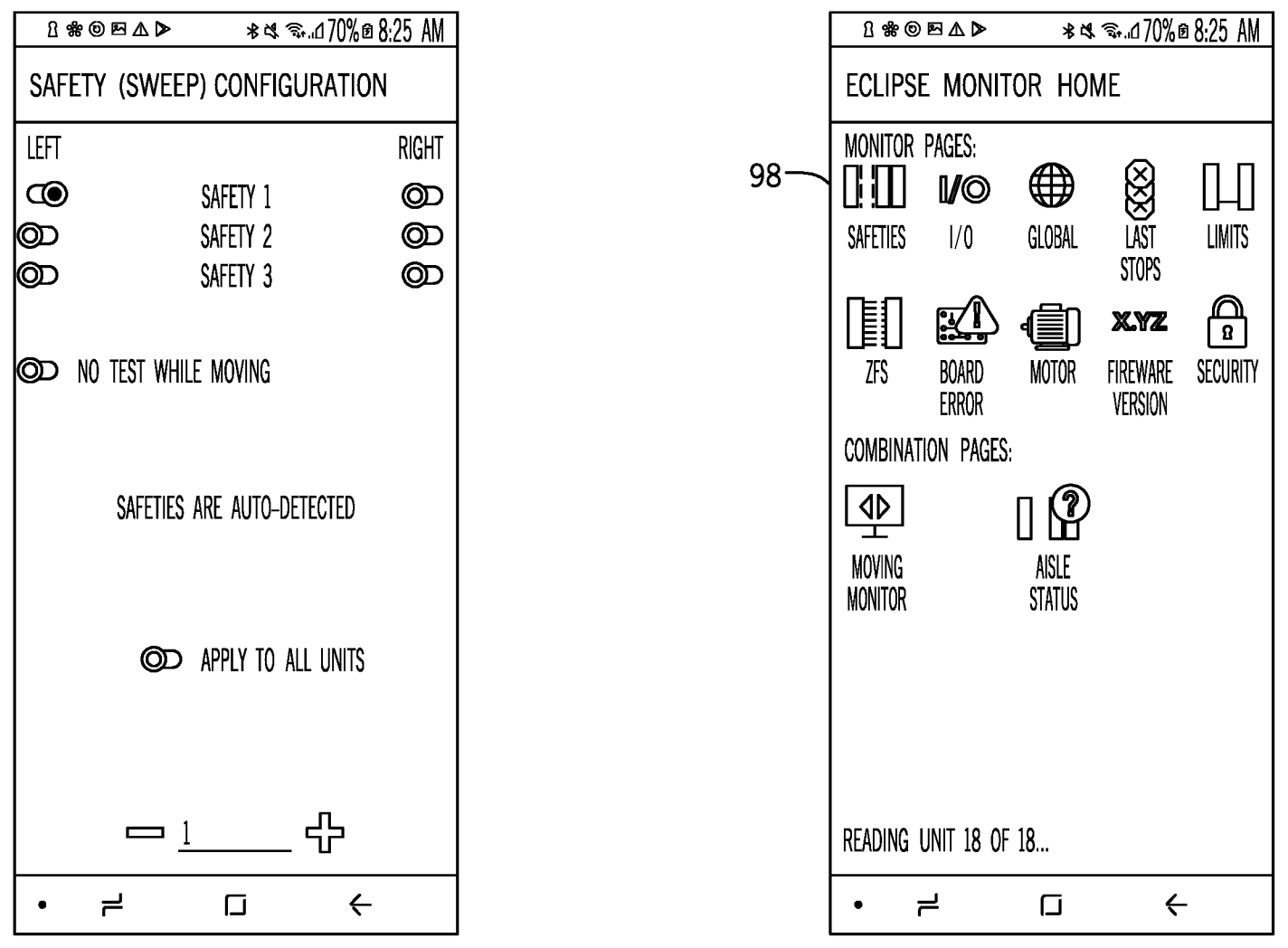

Configurations on the local control units 22 can be changed by pressing the "CONFIG" button 90 in the Eclipse Operations section 92 of the main page 60 shown in FIG. 12. A screen, such as shown in FIG. 17 is then displayed on the smart device 38. The screen displays a listing of the configuration categories for the mobile storage system 10. Each configuration category has a button that when pressed opens a page allowing specific changes to be configured, read, and saved to the mobile storage system 10. An example is when the "SAFETY" button 94 is pressed on the display shown in FIG. 17. A separate page, such as shown in FIG. 18, will be displayed on the smart device 38. A similar operation occurs for each configuration category shown in the display of FIG. 17.

The system of the present disclosure also includes the ability to diagnose system status/faults/last stops. The system guides the user/operator through what parts may be needed/how to troubleshoot/contact information/serial number/order number.

The application software used in accordance with the present disclosure connects to the mobile storage system 10 giving the service personnel the ability to determine system health, find problems and give guidance to remedy problems.

FIG. 12 shows an example of the diagnostic and service application software main page. When the "MONITOR" button 96 is pressed on the main page 60 in the Eclipse Operations section 92, the Eclipse Monitor Home (FIG. 19) is displayed. From this page all the operations of the mobile storage system 10 are categorized. Each monitor category has a button that when pressed opens a page showing real-time status and operation in the mobile storage system. As an example, when the "SAFETIES" button 98 is pressed in the display of FIG. 19, the Safety Status page shown in FIG. 20 is displayed on the smart device. On the safety status page of FIG. 19, the current status of the safeties is displayed as Normal in blue lettering. If the safeties are activated, the message is changed to Activated in red lettering. Each unit in the mobile storage system has a Safety Status page used to determine where Activated and Normal safeties are within the mobile storage system. A similar operation occurs for each monitor category on the Eclipse Monitor Home page shown in FIG. 19.

Referring back to FIG. 12, the main page shows an example of the diagnostic and service application software main page. When the "MONITOR" button 100 is pressed on the main page in the ModLogic Operations section 64, the ModLogic Status page (FIG. 21) is displayed. From this page, the status of all the ModLogic park triggers, I/O, and firmware revisions are displayed. When the state of any of these monitored items changes, the displayed text changes in real-time.

With so many ways to configure and monitor the mobile storage system 10 it could take a long time to diagnose and make appropriate settings changes. To simplify diagnoses of the mobile storage system 10, a System Check page has been created. The main page of FIG. 12 shows an example of the diagnostic and service application software main page. When the "SYSTEM CHECK" button 102 is pressed on the main page in the Eclipse Operations section 92, the System Check page (FIG. 22) is displayed on the smart device. When the "SYSTEM CHECK" button 104 is pressed, the diagnostic and monitor information for the entire system is collected. The information is then compared to stored templates for the normal operating conditions of the mobile storage system 10. Every error and inconsistency is reported with a location in the mobile storage system along with an explanation to why it is reported and suggestions to how it might be remedied. This is a powerful tool to quickly determine system health of the mobile storage system.

Ability to send a diagnostic snapshot or send service information in real-time to the manufacturer/distributor of the mobile storage system 10 is also a feature of the present disclosure. The manufacturer's service department can then contact the user/operator for troubleshooting help. FIG. 12 shows an example of the diagnostic and service application software main page. When the "SYSTEM SAVE" button is pressed on the "System File Operations (ECF):" section 76 of the main page 60, a page is displayed where the service and installation personnel can enter descriptive text in various fields as shown in FIG. 23. After entering the information in one of the text boxes, the "SAVE" button 108 is pressed and all the system parameters and status information along with the descriptive text is saved into a file that can then be emailed to others such as the service department for assistance as needed. It is also envisioned that such information can be shared real-time to further ease installation and service.

The system of the present disclosure also includes application software to alert service personnel that the system needs preventive maintenance and what should be checked. Utilizing the system check features along with information such as movement counts and installation dates, the application software can be set up to send and alert service personnel that preventative maintenance is due.

The system and software of the present disclosure includes an auto connect feature to connect to nearest system or select a detectable system. The application software has the ability to access resources on the smart device. One specific resource reports the number Bluetooth devices found during a scanning process. The master controller 42 contains a name and characteristics that are unique to the master controller 42. The application software scans for Bluetooth devices and uses the unique name and characteristics to find devices of interest. This is how it finds all detectable mobile storage systems that are in range. The nearest mobile storage system is found by the application software using Bluetooth signal strength. The stronger the signal, the closer the mobile storage system.

The system and software of the present disclosure provides a system lock-out feature in which system movement is not allowed from other sources while application software is connected to the mobile storage system. When the application software establishes a wireless connection to the master controller on the mobile storage system, all access is disabled from other sources. Some of these sources include the local control panel 24 that is mounted on each mobile unit 12, other smart devices with the application software, RF remotes, and IR remotes. The one control that is always active from every source is the Stop button shown in FIG. 11. The lockout feature gives an added level of assurance to the service personal that while working on the system it cannot be moved by anyone else while the application software is connected.

Figure 24:
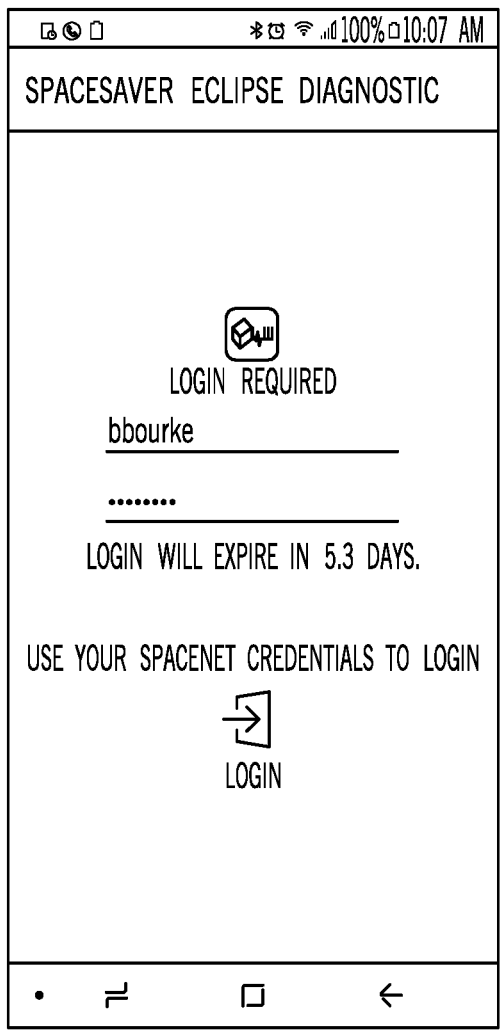

Security for the service application software is provided via a login screen requiring entry of a registered user name and password upon opening the application. FIG. 24 shows an example of a login screen. Correct credentials is a required security measure to assure that only authorized users can connect via the application software to a mobile storage system 10. Periodic entry of credentials may be required on a smart device 38 to verify a user continues to be registered. At the time of login, the master controller 42 may log the event as well as the smart device's unique identifier.

The system and software of the present disclosure provides a user lock-out feature in which only one person at a time can be connected to the system. The user lock-out feature allows an administrator to set a mobile storage system and application software so that movement and access to the mobile storage system is only allowed via the application software. This feature may be used in areas of public access such as a library where students and faculty are issued the application software and the controls on the system are locked out. This ensures that only one user at a time can access the system. This also allows a complete log of who accessed the system, where access occurred, the time and date of the access, as well as the duration of the access Links to online step by step assistance for installation and service is also provided by the software and system of the present disclosure. When further information that cannot be practically maintained in the application software is required, links to online step by step assistance are embedded within the application software. The information at these on-line links can be maintained and managed separately from the application software allowing frequent update with current information.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A mobile storage system, comprising:
a plurality of movable storage units, wherein each of the storage units includes a local control unit and a local control panel, wherein the local control panel allows a user to manually enter control commands to move the storage unit;
a master controller in communication with the plurality of local control units of the plurality of movable storage units;
a wireless transceiver in communication with the master controller to receive and transmit messages from the master controller; and
a user device including a display that allows the user to enter commands and view control images related to the mobile storage system, wherein the user device is in wireless communication with the master controller such that the user controls operation of the mobile storage system through the user device,
wherein when the user device and the master controller have created a wireless connection, the master controller disables each of the local control panels and prevents a wireless connection with another user device.

2. The mobile storage system of claim 1, wherein the display includes a visual representation of the series of movable storage units and a current location of each of the plurality of movable storage units.

3. The mobile storage system of claim 1, wherein the master controller is mounted to one of the plurality of movable storage units.

4. The mobile storage system of claim 1, wherein the user device is operable to upload any one or more of operating parameters, software updates, and operating programs from the user device to the master controller utilizing the wireless connection.

5. The mobile storage system of claim 1, wherein the master controller is operable to wirelessly transmit diagnostic information about the mobile storage system to the user device utilizing the wireless connection.

6. A mobile storage system, comprising:
a plurality of movable storage units, wherein each of the storage units includes a local control unit and a local control panel, wherein the local control panel allows a user to manually enter control commands to move the storage unit;
a master controller in communication with the plurality of local control units of the plurality of movable storage units;
a wireless transceiver in communication with the master controller to receive and transmit messages from the master controller; and
a user device including a display that allows the user to enter commands and view control images related to the mobile storage system, wherein the user device is in wireless communication with the master controller such that the user controls operation of the mobile storage system through the user device,
wherein the display includes a plurality of aisle indicators each representing an aisle between a pair of the plurality of movable storage units, wherein the user is able to create separation between a pair of movable storage units by depressing the aisle indicator.

7. The mobile storage system of claim 6, further comprising a visual indicator surrounding each of the plurality of aisle indicators, wherein a color of the visual indicator indicates a status of the aisle.

8. The mobile storage system of claim 6, wherein the display includes an inventory list button for each aisle between a pair of the plurality of movable storage units, wherein the user is able to view an inventory of the pair of movable storage units by depressing the inventory list button on the display.

9. The mobile storage system of claim 8, wherein the display includes a search bar that allows the user to search an inventory of the series of movable storage units, wherein an aisle indicator is highlighted for an aisle including the located inventory.

10. A mobile storage system, comprising:
a plurality of movable storage units, wherein each of the storage units includes a local control panel that is operable to allow a user to manually enter control commands to move the storage unit;
a master controller mounted to one of the plurality of movable storage units and in communication with the plurality of local control panels of the plurality of movable storage units;
a wireless transceiver in communication with the master controller to receive and transmit commands from the master controller; and
a user device including a display that allows the user to enter commands and view control images related to the status of the mobile storage system, wherein the user device is in wireless communication with the master controller such that the user controls operation of the mobile storage system through the user device.

11. The mobile storage system of claim 10, wherein when the user device is in communication with the master controller, each of the local control panels is disabled.

12. The mobile storage system of claim 11, wherein when the user device and the master controller have created a wireless connection, the master controller disables the local control panels and prevents a wireless connection with another user device.

13. The mobile storage system of claim 10, wherein the display includes a visual representation of the series of mobile storage units, the display including a plurality of aisle indicators each representing an aisle between a pair of the plurality of movable storage units, wherein the user is able to create separation between a pair of movable storage units by depressing the aisle indicator.

14. The mobile storage system of claim 13, further comprising a visual indicator surrounding each of the plurality of aisle indicators, wherein a color of the visual indicator indicates a status of the aisle.

15. A method of controlling operation of a mobile storage system including a plurality of movable storage units, comprising the steps of:
controlling operation of the mobile storage system utilizing a local control panel positioned on each of the storage units;
providing a master controller in communication with the plurality of local control panels of the plurality of movable storage units;
creating a wireless connection between a user device and the master controller;
receiving operating commands from the user device by the master controller;
disabling each of the local control panels when the user device is in wireless communication with master controller such that only the user device can cause movement of the plurality of movable storage units;
preventing a wireless connection between the master controller and another user device when the master controller is in wireless communication with the user device; and
adjusting the position of the plurality of movable storage units utilizing the master controller based upon the commands received from the user through the user device.

16. The method of claim 15, further comprising the step of presenting a visual representation of the series of movable storage units and the current location of each of the plurality of movable storage units on the user device.

17. The method of claim 15, further comprising the step of uploading operating parameters, software updates, and operating programs from the user device to the master controller utilizing the wireless connection.

18. The method of claim 15, further comprising the step of wirelessly transmitting diagnostic information about the mobile storage system from the master controller to the user device.

19. A method of controlling operation of a mobile storage system including a plurality of movable storage units, comprising the steps of:
controlling operation of the mobile storage system utilizing a local control panel positioned on each of the storage units;
providing a master controller in communication with the plurality of local control panels of the plurality of movable storage units;
creating a wireless connection between a user device and the master controller;
receiving operating commands from the user device at the master controller;

adjusting the position of the plurality of movable storage units utilizing the master controller based upon the commands received from the user through the user device; and presenting an aisle indicator on the display for each aisle between a pair of the plurality of movable storage units, wherein the user is able to create separation between a pair of the movable storage units by depressing the aisle indicator.

* * * * *